United States Patent [19]

Lindgren

[11] Patent Number: 4,831,298
[45] Date of Patent: May 16, 1989

[54] INDUCTIVE TORQUE TRANSMITTER WITH STATIONARY FIELD WINDING

[76] Inventor: Theodore D. Lindgren, 6318 Cherry Hills Rd., Houston, Tex. 77069

[21] Appl. No.: 128,717

[22] Filed: Dec. 4, 1987

[51] Int. Cl.[4] .......................................... H02K 49/02
[52] U.S. Cl. .................................. 310/106; 310/266; 310/125
[58] Field of Search ................. 310/105, 106, 190, 78, 310/103, 104, 166, 261, 266, 125

[56] References Cited

U.S. PATENT DOCUMENTS

| | | | |
|---|---|---|---|
| 1,933,498 | 10/1933 | Morrill | 310/211 |
| 3,209,184 | 9/1965 | Woodward, Jr. | 310/106 |
| 3,372,292 | 3/1968 | Lynch et al. | 310/105 |
| 3,469,124 | 9/1969 | Willcox | 310/266 |
| 3,532,916 | 10/1970 | Fisher | 310/266 |
| 3,939,370 | 2/1976 | Müller | 310/125 |
| 4,146,805 | 3/1979 | Fehr et al. | 310/104 |
| 4,714,854 | 12/1987 | Oudet | 310/268 |

FOREIGN PATENT DOCUMENTS 1249717 11/1960 France ................... 310/266

Primary Examiner—Patrick R. Salce
Assistant Examiner—D. L. Rebsch
Attorney, Agent, or Firm—Theodore D. Lindgren

[57] ABSTRACT

An electromagnetic torque transmission structure for transmitting torque from one shaft to a second aligned shaft, the structure including an excitation-rotor attached to a first shaft, an induction-rotor attached to a second shaft, and a magnetic field-exciter. An inner pole, an outer pole and a pole-connecter of the excitation-rotor surround the inner and outer surfaces and one end of the hollow induction-rotor cylinder. At least an inner or outer pole includes field concentrators. A stationary winding with magnetic circuitry provides an excitation field associated with the excitation-rotor. Magnetic fields from induced currents in the induction-rotor react with fields from the excitation-rotor to provide torque transmission between shafts.

11 Claims, 2 Drawing Sheets

INDUCTIVE TORQUE TRANSMITTER WITH STATIONARY FIELD WINDING

RELATED APPLICATIONS

This application is realted to U.S. Patent Application Ser. No. 128,716, Brushless Alternator and Synchronous Motor With optional Stationary Field Winding; to U.S. Patent Application Ser. No. 128,719, Dual-Rotor Induction Motor With Stationary Field Winding; and to U.S. Patent Application Ser. No. 128,718, Transformer and Synchronous Machine With Stationary Field Winding; all of which were filed by the same inventor on the same date as this application.

BACKGROUND OF THE INVENTION

1. Field of the Invention

This invention is in the field of torque transmission and, in particular, the field of electromagnetic coupling of torque from one shaft to a second shaft aligned with the first shaft.

2. Description of the Prior Art

Commercially successful prior-art devices for transmission of torque from one shaft to a second aligned shaft primarily use mechanical or fluid means for transmission of rotational forces. The use of electrical torque transmission methods, such as generator-motor combinations, has been generally limited to applications in which torque is transmitted to a remote location. The additional construction expense, the size and the weight associated with use of traditional generator-motor devices generally precludes use where torque is transmitted from one shaft to a second aligned shaft.

BRIEF SUMMARY OF THE INVENTION

This invention discloses an electromagnetic torque transmitter that includes a double-rotor structure having an excitation-rotor attached to a first shaft, a hollow cylindrical induction-rotor attached to a second shaft, and a stationary field-excitation means. The cylindrical excitation-rotor includes inner- and outer-pole members concentrically attached to one side of a pole-connecting means. The outer-pole member, inner-pole member and pole-connecting means surround the outer and the inner surfaces of and one end of the hollow cylindrical induction-rotor. At least one of the inner-and outer-pole members includes field concentrator members. A stationary field winding with associated magnetic circuitry is used to provide field excitation to the excitation-rotor. The field-excitation means combines with the excitation-rotor to provide time-and space-varying magnetic fields that induce currents in the induction-rotor during operation. The induced currents produce magnetic fields which react with the excitation-rotor fields to provide torque transmission between shafts.

DETAILED DESCRIPTION OF THE PREFERRED EMBODIMENTS

Figure 1:
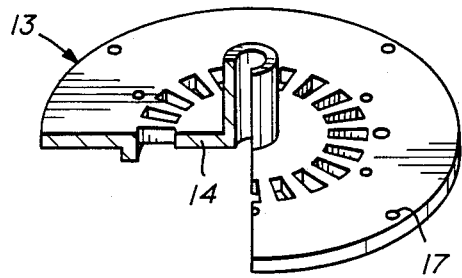
FIG. 1 is an isometric, axially expanded depiction, in partial cross-section, of the invention as embodied with a laminated field-excitation stator.
Figure 1:
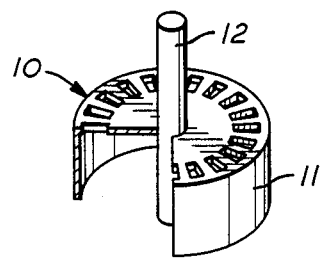
Figure 1:
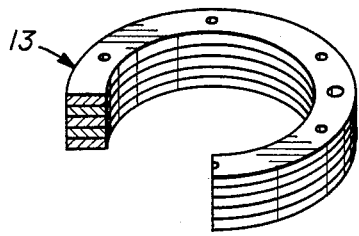
Figure 1:
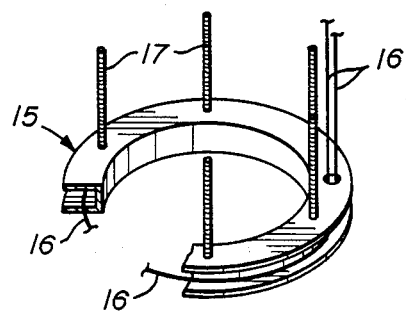
Figure 1:
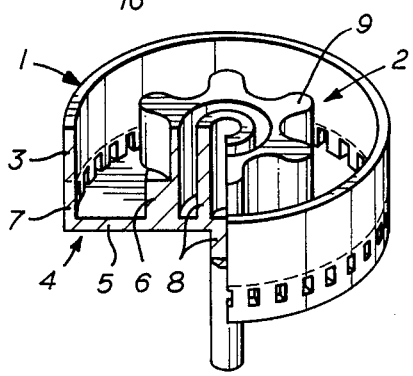
Figure 2:
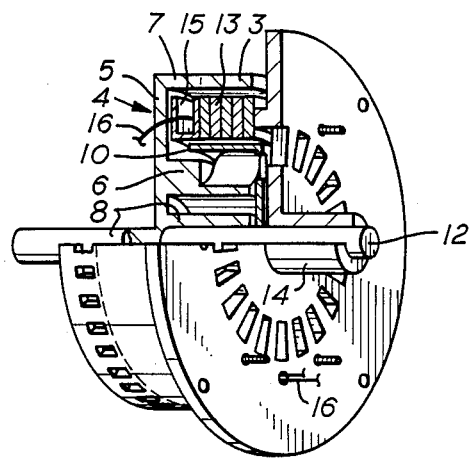
FIG. 2 is an isometric depiction, in partial cross-section, of the device of FIG. 1 in assembled form.

Referring to FIGS. 1, 2, 3 and 4, excitation-rotor 1 includes a cylindrical inner-pole member 2 and a cylindrical outer-pole member 3, both pole members 2 and 3 being concentrically attached to, or formed with, annular pole-connecting means 4 such that poles 2 and 3 extend from the same side of connector 4. Connector 4 is illustrated in FIGS. 1 and 2 as including annular excitation-rotor disc member 5 with concentrically attached inner and outer extensions 6 and 7 which are attached to, or formed with, pole members 2 and 3. Pole members 2 and 3 and inner and outer extensions 6 and 7 are fabricated using material having relatively high magnetic permeability. Excitation-rotor positioning means 8 includes a first shaft concentrically attached to, or formed with, members 2 and 3 and connector 4. Field concentrator members 9 are illustrated as forming inner pole 2.

Figure 3:
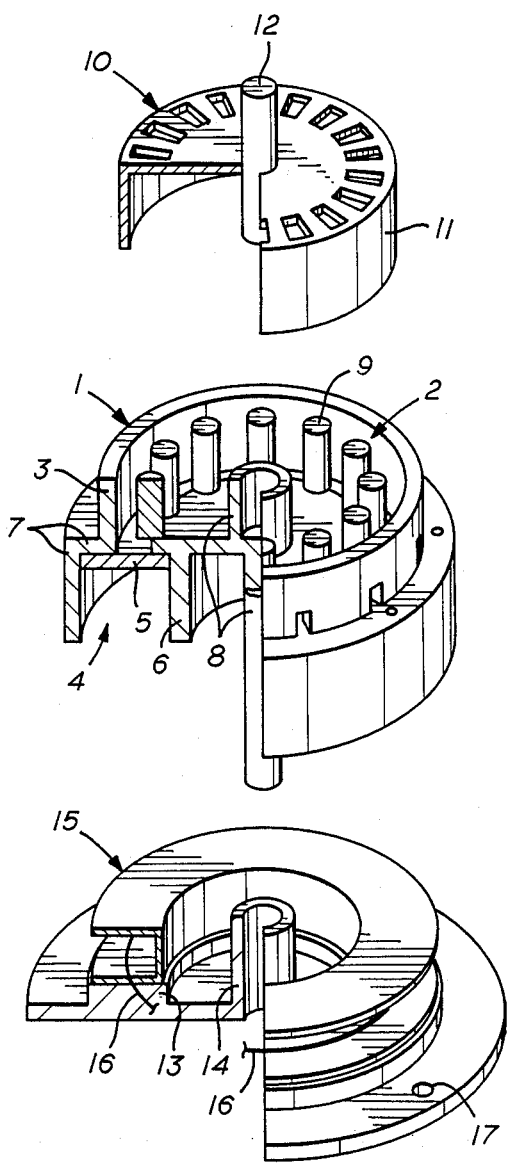
FIG. 3 is an isometric, axially expanded depiction, in partial cross-section, of the invention as embodied with a non-ferrous excitation-rotor disc and a non-laminated field-excitation stator.
Figure 4:
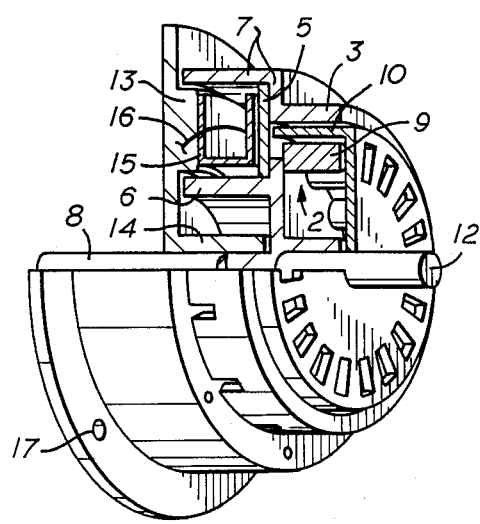
FIG. 4 is an isometric depiction, in partial cross-section, of the device of FIG. 3 in assembled form.

Excitation-rotor disc 5, as illustrated in FIGS. 1 and 2, is fabricated using material having relatively high magnetic permeability. As illustrated in FIGS. 3 and 4, excitation-rotor disc 5 is fabricated using material having relatively low magnetic permeability in at least a circumferential portion between extensions 6 and 7. In FIGS. 3 and 4, extensions 6 and 7 extend radially and axially a distance from excitation-rotor disc 5 in the direction opposite pole members 2 and 3.

Induction-rotor 10 includes inductive-means 11 which is illustrated in the Figures as a hollow cylinder 11. Cylinder 11 is fabricated using electrically conductive material and has a relatively short radial thickness. Inductive-means 11 may, in the alternative, include a hollow, cylindrical, laminated, magnetic core on which squirrel-cage windings are formed. Cylinder 11 is attached to, or formed with, induction-rotor positioning means 12, which includes a second shaft 12a and a third shaft 12b. Induction-rotor positioning means 12 and excitation-rotor positioning means 8 position inductive-means 11 and poles 2 and 3 such that an air gap exists between each outer surface of inner pole 2 and the inner-cylindrical surface of inductive-means 11 and such that at least one air gap exists between the inner surface of outer-pole 3 and the outer-cylindrical surface of inductive-means 11.

Hollow cylindrical stator 13, as illustrated in FIGS. 1 and 2, is concentrically attached to stator positioning means 14. Stator 13 is positioned concentrically by stator positioning means 14, by induction-rotor positioning means 12, and by excitation-rotor positioning means 8 such that an air gap exists between the inner-cylindrical surface of stator 13 and the outer-cylindrical surface of inductive-means 11 and such that an air gap exists between the outer-cylindrical surface of stator 13 and the inner surface of outer pole 3. Stator 13 is illustrated in FIGS. 1 and 2 as a high-magnetic-permeability configuration including commonly used layers of sheet steel or other magnetically permeable material separated by material having high electrical resistivity. The laminations should preferably be planar in planes defined by the structure cylindrical-coordinate, radial-angular directions, where the axial coordinate of the structure is defined to coincide with the centers of the first and second shafts.

Stator 13, as illustrated in FIGS. 3 and 4, is positioned concentrically by stator positioning means 14 and by excitation-rotor positioning means 8 such that a short air gap exists between the end of the outer-cylindrical surface of inner extension 6 opposite inner pole 2 and the cylindrical surface of stator 13 and such that a short air gap exists between the cylindrical surface of stator 13 and the end of the inner-cylindrical surface of outer extension 7 of connector 4 opposite outer pole 3. Excitation-rotor means 1 and induction-rotor means 10 are positioned concentrically by excitation-rotor positioning means 8 and inductive-rotor positioning means 12 such that only one air gap exists between the outer-cylindrical surface of inductive-means 11 and the inner surface of outer pole 3. The axial length of stator 13 defines the axial length of poles 2 and 3 for the purposes of this description Field winding 15 is illustrated in the Figures as including an insulated conductor 16 attached to the end of cylindrical stator 13 adjacent to disc 5 of connector 4. The ends of conductor 16 should usually extend through the stator 13 of FIGS. 1 and 2 in close proximity to each other, to prevent alternating voltages and currents from being induced in winding 15. Attaching means 17 attaches stator 13 and field winding 15 to a reference structure, not shown.

During operation, a source of preferably direct current energy is connected to conductor 16 of field winding 15. For most applications the source should provide a variable magnitude direct current to winding 15. The currents in field winding 15 and in inductive-means 11 produce magnetic fields that extend through paths consisting of stator 13, inner and outer poles 2 and 3, inductive-means 11 and, in Figures 1 and 2, connector 4 including disc 5. In FIGS. 3 and 4, the field path includes extensions 6 and 7 but does not include disc 5 of connector 4. If there is a relative torque difference between the first shaft of excitation-rotor positioning means 8 and the second shaft of induction-rotor positioning means 12, inductive-means 11 will rotate at a speed less than, or grater than, the rotational speed of poles 2 and 3. The concentration of magnetic fields caused by concentrators 9 induces currents in inductive-means 11. The reaction of the fields associated with concentrators 9 with the fields associated with the currents induced in inductive-means 11 causes torque to be transmitted between the first shaft and the second shaft of positioning means 8 and 12. The torque transmitted varies with the magnitude of current in field winding 15 and with the slippage between rotors 1 and 10.

Winding 15 may be energized by alternating current windings, not illustrated, mounted on stator 13 of FIGS. 1 and 2 and with appropriate circuitry to convert the alternating current to direct current. Use of such circuitry requires that poles 2 and 3 have sufficient residual magnetism to initiate current flow during onset of operation.

Field concentrators 9 of excitation-rotor 1 are indicate in FIGS. 1 and 2 as being shaped with non-uniform-length air gaps between the outer surfaces of each concentrator 9 and inner-cylindrical surface of inductive-means 11. The shapes of concentrators 9 may be, for example, sinusoidal or half-sinusoidal with uniform-length air gaps, although those configurations are better suited for use with a squirrel-cage version of inductive-means 11 rather than with a conductive cylinder version of inductive-means 11 because of resulting concentrations of current in a conductive cylinder and the possibly excessive heat generated thereby. The shape and number of concentrators 9 should be chosen to avoid unnecessary concentrations of current in a conductive cylinder version of inductive-cylinder 11. Concentrators 9 may be formed to have increased thickness at the ends near connector 4 to provide improved structural integrity and to provide more uniform magnetic flux density throughout each such concentrator 9.

Figure 1A:
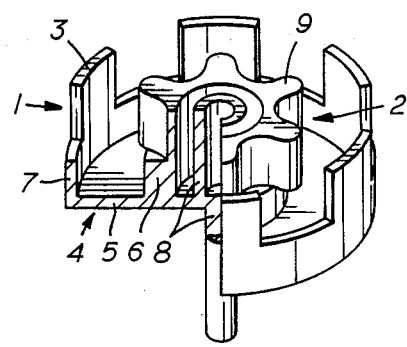
FIG. 1A is an alternate embodiment of an excitation-rotor for use in the embodiment of FIG. 1.

Concentrators 9 may be included in either or both inner and outer poles 2 and 3 of excitation-rotor 1. If concentrators 9 are used for both inner and outer poles 2 and 3, concentrators 9 should be paired along the same radii as illustrated in FIG. 1A. Outer pole 3, if including concentrators 9, should preferably include concentrators 9 fabricated in an enclosed cylinder having non-uniform air gaps if the application requires minimization of radiation of energy at frequencies that may cause interference with operation of any nearby electronic equipment.

In the embodiment of FIGS. 3 and 4, extensions 6 and 7 of connector 4 must be of sufficient length that the magnetic flux density in the air gaps between extensions 6 and 7 and stator disc 16 is uniform throughout the circumference of those air gaps. A non-uniform magnetic flux density in those air gaps will cause eddy currents to be induced in stator 13. Those currents will cause a friction-like torque that will degrade performance of the device and may cause the temperature of the metal near the air gap to rise to excessive levels.

Operation of the device will cause positively and negatively charged regions in inner and outer portions of excitation-rotor 1 because the magnetic field associated with field winding 15 does not rotate. For applications at usual rotational speeds, the electric fields associated with those charges may be ignored.

If a conductive cylinder is included in inductive-means 11, that cylinder should have a relatively short radial thickness to minimize the effective length of the air gap between inner and outer poles. Use of a squirrel-cage winding mounted on a laminated steel core, or use of a cylinder 11 composed of a material that is both conductive and has a high magnetic permeability, will result in decrease of the effective length of the air gap.

The means for inducing field excitation for FIGS. 1, 2, 3 and 4 includes field winding 15, a magnetic circuit means including stator 13, and stator positioning means 14. The magnetic circuit means completes the closed magnetic field path which includes magnetically permeable poles 2 and 3, extensions 6 and 7 and the radial thickness of inductive-means 11. The closed magnetic field follows a path that passes through the circle formed by field winding 15.

In FIGS. 1 and 2, the magnetic circuit means includes stator 13 and magnetically permeable excitation-rotor disc 5. Stator 13 extends into the air gap between inductive-means 11 and outer pole 3, causing the closed magnetic field path to have a third air gap.

In FIGS. 3 and 4, the magnetic circuit means includes stator 13 and elongated magnetically permeable extensions 6 and 7. Excitation-rotor disc 5 must be composed of material with low magnetic permeability. The air gaps between stator 13 and extensions 6 and 7 result in a total of four air gaps in the closed magnetic field path.

Excitation-rotor positioning means 8, induction-rotor positioning means 12 and stator positioning means 14 may be of sleeve, ball, roller or other configurations known in the art. As is well-known, positioning means 8, 12 and 14 may each take any of several configurations that accomplish the purpose of maintaining the relative rotary positions of excitation-rotor means 1, induction-rotor means 10 and stator 13. Such configurations include shafts and journals attached to or formed with any or all of excitation-rotor means 1, induction-rotor means 10 and stator 13. Torque may be transmitted to or from any part of excitation-rotor 1 or induction-rotor 10. For example, belt pulleys may be attached to either or both rotor first and second shafts, or may be formed with rotor positioning means 8 and 12.

Field winding 15 should be attached to stator 13 such that conductor 16 is at least a short distance from any magnetically permeable part, including stator 13 to which it is attached.

Stator positioning means 14 should be formed from nonmagnetic material in at least the region extending between inner pole 2 and outer pole 3 or should be constructed such that its nearest surface is distanced from either pole 2 or 3 by a relatively long air gap.

Attaching means 17 attaches field winding 15, stator 13 and stator positioning means 14 to a reference structure, not shown. Attaching means 17 may include bolts extending through the length of stator 13. In the configuration of FIGS. 1 and 2, bolts 17 should preferably be composed of material having a very high electrical resistivity. If the bolts 17 are electrically conductive, they should be insulated from electrically conductive parts to prevent undesired current flow from voltages induced along their lengths by time-varying fields that pass through the stator. To minimize the possibility of undesired current flow, the number of bolts 17 should be equal to the number of concentrators 9 and the bolts 17 should be spaced uniformly around an end circumference of stator 13. Each of the insulated bolts 17 may be electrically grounded at one end, for example, to a reference structure. The same considerations apply to use of clamps or other devices for attaching means 17.

The embodiments described above and indicated in drawings are illustrative and are not to be interpreted in a limiting sense. Many variations, modifications and substitutions may be made without departing from the scope of the claimed invention. Certain of those variations, modifications and improvements may be patentable, yet fall within the claims of this invention.

I claim:

1. An electromagnetic torque transmission structure including an excitation-rotor, an induction-rotor, and a means for inducing field excitation;
   wherein said excitation-rotor includes
   a magnetically permeable cylindrical inner-pole member having at least one outer surface,
   a magnetically permeable cylindrical outer-pole member having at least one inner surface,
   a pole-connecting means including an annular excitation-rotor disc member with concentrically attached, magnetically permeable cylindrical extensions to which said pole members are attached on one side, and
   a concentrically attached excitation-rotor positioning means including a first shaft;
   wherein said induction-rotor includes
   a hollow cylindrical inductive-means having inner- and outer-cylindrical surfaces,
   an annular induction-rotor disc member concentrically attached at one end of said inductive means, and
   a concentrically attached induction-rotor positioning means including a second shaft;
   wherein said means for inducing field excitation includes
   a field winding,
   an excitation magnetic circuit means including a hollow cylindrical stator having inner- and outer-cylindrical surfaces and with said field winding attached at one end thereof, and
   a stator positioning means;
   wherein at least one of said cylindrical pole members further includes at least one magnetic field concentrator member;
   wherein said excitation-rotor and said induction-rotor are independently, rotatably and concentrically positioned with respect to said hollow cylindrical stator by said excitation-rotor positioning means and said induction-rotor positioning means and said stator positioning means such that at least one air gap is formed between each said outer surface of said inner-pole member and said inner-cylindrical surface of said inductive-means and such that at least one air gap is formed between each said inner surface of said outer-pole member and said outer-cylindrical surface of said inductive-means;
   wherein said pole-connecting means and said induction-rotor disc member are at opposite ends of said air gaps;
   wherein said magnetic circuit means completes the magnetic field path including said pole-members, said inductive-means and said cylindrical stator; and
   wherein said field winding is mounted on said cylindrical stator on the end adjacent to said disc member of said connector means.

2. The structure of claim 1 in which said magnetic circuit means includes said hollow cylindrical stator and said annular excitation-rotor disc member, wherein said excitation-rotor disc further includes magnetically permeable material and wherein said cylindrical stator is positioned by said stator positioning means such that an air gap is formed between each said outer surface of said inner-pole member and said inner-cylindrical surface of said stator and such that an air gap is formed between said inner surface of said outer-pole member and said outer-cylindrical surface of said stator.

3. The structure of claim 1 in which said magnetic circuit means includes said extensions of said pole-connecting means, wherein said annular excitation-rotor disc member has relatively low magnetic permeability, wherein said cylindrical extensions extend an axial distance from said excitation-rotor disc member in the direction opposite said pole members, wherein said hollow cylindrical stator is positioned by said stator positioning means such that an air gap is formed between the outer-cylindrical surface of said inner extension and said inner-cylindrical surface of said cylindrical stator and such that an air gap is formed between the inner-cylindrical surface of said outer extension and said outer-cylindrical surface of said cylindrical stator.

4. The structure of claim 1 in which said inductive-means further includes a hollow conductive cylinder.

5. The structure of claim 1 in which said inductive-means further includes a hollow conductive cylinder having relatively high magnetic permeability.

6. The structure of claim 1 in which said inductive-means further includes a squirrel-cage winding mounted on a hollow cylindrical core that further includes laminated sheet steel with laminations separated by material having relatively high electrical resistivity.

7. The structure of claim 1 in which said inductive-means further includes a squirrel-cage winding mounted on hollow cylindrical core that further includes laminated sheet steel with laminations separated by material having relatively high resistivity, wherein said laminations are planar in planes defined by the structure cylindrical-coordinate, radial-angular directions.

8. The structure of claim 1 in which said concentrator member forms a non-uniform surface for one of said air gaps.

9. The structure of claim 1 in which said concentrator member is sinusoidally shaped.

10. The structure of claim 1 in which said concentrator member is half-sinusoidally shaped.

11. The structure of claim 1 in which one of said synchronous-rotor positioning means, said induction-rotor positioning means, and said stator positioning means includes a third shaft.

* * * * *

UNITED STATES PATENT AND TRADEMARK OFFICE
CERTIFICATE OF CORRECTION

PATENT NO. : 4,831,298
DATED : May 16, 1989
INVENTOR(S) : Theodore D. Lindgren

It is certified that error appears in the above-identified patent and that said Letters Patent is hereby corrected as shown below:

Col. 1, line 7, "realted" should be --related--.

Col. 1, line 9, "optional" should be --Optional--.

Col. 3, line 43, "grater" should be --greater--.

Col. 3, line 61, "cate" should be --cated--.

Signed and Sealed this

Thirtieth Day of January, 1990

*Attest:*

JEFFREY M. SAMUELS

*Attesting Officer*     *Acting Commissioner of Patents and Trademarks*